Aug. 25, 1959
F. BONDANINI
2,900,896
COFFEE FILTER POT
Filed July 16, 1957
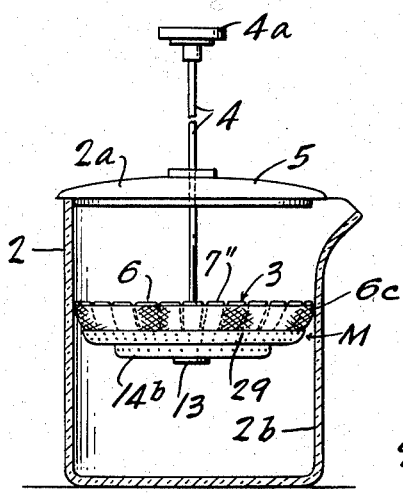
FIG-1-
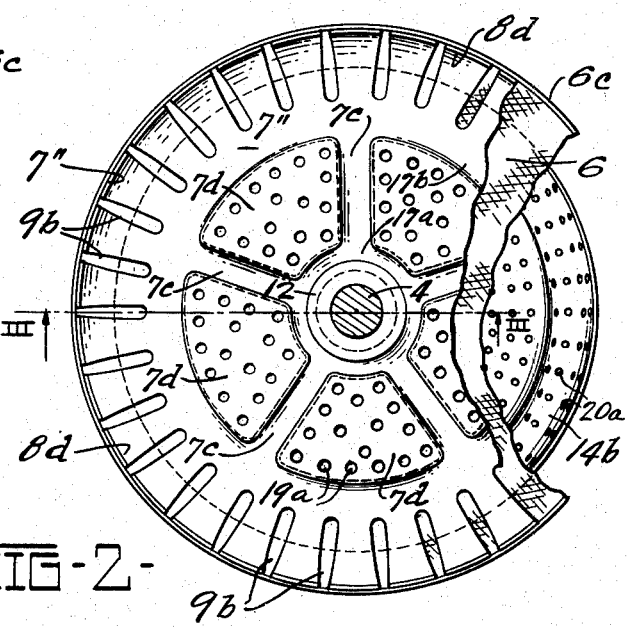
FIG-2-
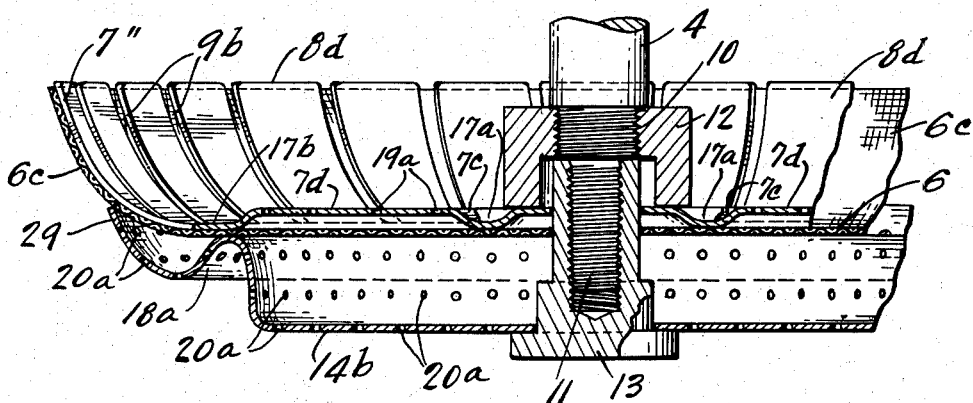
FIG-3-

United States Patent Office 2,900,896
Patented Aug. 25, 1959

2,900,896
COFFEE FILTER POT

Faliero Bondanini, Lausanne, Switzerland

Application July 16, 1957, Serial No. 672,146

Claims priority, application Switzerland February 25, 1955

3 Claims. (Cl. 99—297)

This invention relates to apparatus for the preparation and the filtration of infusions such as coffee or tea, and more particularly to such apparatus comprising a receiver or pot in which there is provided a piston permeable to the liquids and having a piston rod guided through a cover for the receiver and having a body defined by a filter and a stock or frame supporting this filter. This is a continuation-in-part of application Ser. No. 568,091, filed February 27, 1956.

In the drawing, showing one embodiment of this invention by way of example,

Fig. 1 is a view of this embodiment in vertical axial section;

Fig. 2 is a partial bottom view on an enlarged scale of certain parts of this embodiment one part of which is seen in horizontal section;

Fig. 3 is a sectional view along the line III—III of Fig. 2, on an enlarged scale.

The apparatus shown in Figs. 1 to 3 comprises a receiver or pot 2 substantially cylindrical in form, made of glass or porcelain, with an upper spout.

In the receiver 2 is a piston 3 which is permeable to liquids and the piston rod 4 is slidably guided through a hole in a removable cover 5 through which rod 4 extends and is provided with an exterior handle 4a. The body of the piston 3 is defined by a filter 6 and a stock or frame M supporting this filter. This frame comprises two disks of metal sheet 7" and 14b in open work. The disk 7" has the general form of a dish made of a metal sheet cut and stamped in such a way that it presents an open work bottom and a peripheral wall 8d which is divided into flexible tongues by slits 9b. By stamping, radial nervures or ribs 7c are formed in the bottom of the disk 7" between sectors 7d which are embossed upwardly in such a way that these radial ribs join two radially-spaced annular zones 17a and 17b which are at the same level as theirs, the zone 17a defining a central portion at the same level as the sectors 7d and the zone 17b surrounding these sectors and extending to the wall 8d which joins it by an interiorly concave part. The sectional view of this part along a plane normal to the wall has a radius of curvature of approximately thirteen millimeters but it could be smaller. The slits 9b extend toward the bottom at least down to the juncture of the wall 8d with the zone 17b. They would encroach on this zone if the said radius of curvature of the concave part were notably smaller, either of these dispositions allowing the flexibility of the tongues to be sufficient without the height of the wall 8d having to be too great in relation to the possible running height in the pot 2, for a convenient thickness of the metal sheet forming the dish 7".

This thickness, with the length of the slits 9b, determines not only the flexibility of the tongues necessary to compensate the irregularities of form of the pot 2, but also the greatness of the elastic reactions of the tongues when they are urged to yield by the introduction of the piston in the pot. Indeed, these reactions must create a rubbing force preventing the piston from going down into the lower part of the pot before the infusion is terminated.

It is seen in Fig. 3 that the filter 6 has a turned up edge 6c which assumes the form of the wall 8d in order to dispose itself between this wall and the inner surface 2b of the pot.

This filter is held in this position by the lower disk 14b which is formed with numerous holes 20a larger in diameter than the interstices of the filter which is made of a tissue of wires of an organic material resistant to boiling water or of wires of an inoxidizable metal.

The disks 7" and 14b are assembled with the rod 4 by means of central threaded organs comprising a blind nut 13 the head of which rests under the disk 14b and the hollow stem of which extends through a central hole in the filter and in the bottom of the disk 7". A bell shaped muff 12, interiorly threaded, is firmly screwed on thread 10 of the rod 4 which ends in a thread 11 of smaller diameter engaging in the nut 13 until the latter is pressed against the bottom of the hollow part of the muff 12 the edge of which rests against the bottom of the disk 7".

The disk 14b is stamped in such a way that it has, facing the zone 17b, a circular rib 18a, and, radially outwardly of the latter, a turned up rim 29. This rib and this rim simultaneously enter into contact with the filter 6 which can be more or less pressed by them against the disk 7" and its wall 8d according to the length given to the nut 13.

The disk 14b also defines two chambers in which the liquid already deprived of the largest particles of the substance placed in the pot for infusion can circulate, this liquid being submitted to a first filtration through the holes 20a the diameter of which is about one millimeter or less. The filter 6 then has only to intercept the fine powder of coffee or tea, etc.

The disk 14b could have several circular ribs like the disk 14a described in U.S. application Serial No. 568,091 filed February 27, 1956, but it could also rest against the filter by its extreme edge or rim 29 alone, the rib 18a not being as high as shown in the drawing or being eliminated. The rim 29 is turned up to an intermediary level between that of the open work bottom of the disk 7" and that of the edge of the wall 8d. Its diameter is preferably as large as allowed by the smallest inner diameter of the pot 2. This pot could have a polygonal form.

What I claim is:

1. An apparatus for the preparation and the filtration of infusions comprising, in combination, a container having a bottom, side walls, and a removable cover, a rod axially slidable in said cover and supporting at its lower end a piston unit extending across the interior of the container and being axially reciprocatable therein, said piston unit being defined by a perforated frame and a filter supported by said frame, and extending across the perforations therein, said frame comprising two sheet metal disks formed with open work to define said perforations, one of said disks defining a dish-shaped unit and said filter being mounted between said disks, said piston rod having a threaded extremity, threaded means engaging with the threaded extremity of the said piston rod and engaging with at least one of said disks to hold said disks, said dish-shaped unit having a rim defining a peripheral wall of constant height on one side of the bottom of said dish-shaped unit, said wall being inclined towards the exterior at least along part of its height and being formed with a plurality of slits dividing the wall into a plurality of free flexible tongues, said slits extending from the outer edge of the wall at least to the juncture of said wall and the bottom of said dish-shaped unit, the juncture of said wall with said bottom being interiorly concave and having a radius of curvature of several millimeters in a plane containing the axis of the rod, said filter having a turned up rim adapted to be located between said tongues and the inner surface of said container, the other of said disks extending radially beyond the inner ends of said slits under the filter and having a turned up rim extending to a level and having a radial dimension intermediate those of the bottom of said dish-shaped unit and of the edge of the free end of said wall, said last-named disk having at least one annular rib turned towards the filter and being formed with a plurality of holes having a diameter less than one millimeter, said holes being distributed over the entire surface of said other disk.

2. An apparatus as defined in claim 1, wherein the bottom of said dish-shaped unit is formed with two radially-spaced-apart annular zones interconnected by radial ribs defining a plurality of circumferentially spaced-apart surface areas provided with apertures.

3. An apparatus as defined in claim 2, wherein one annular rib of said other disk is disposed opposite the radially outermost of said annular zones of the dish-shaped unit.

References Cited in the file of this patent

UNITED STATES PATENTS

| | | |
|---|---|---|
| 2,053,021 | Cassol | Sept. 1, 1936 |
| 2,211,486 | Zoia | Aug. 13, 1940 |

FOREIGN PATENTS

| | | |
|---|---|---|
| 22,396 | Great Britain | of 1903 |